United States Patent [19]

Frazier, III

[11] Patent Number: 4,909,608
[45] Date of Patent: Mar. 20, 1990

[54] OPTICAL MONLINEARITY OF AMINOBENZOPHENONE DERIVATIVES

[75] Inventor: Claude C. Frazier, III, Ellicott City, Md.

[73] Assignee: Martin Marietta Corporation, Bethesda, Md.

[21] Appl. No.: 122,082

[22] Filed: Nov. 17, 1987

[51] Int. Cl.$^4$ ............................ G02F 1/23; G02F 1/37
[52] U.S. Cl. .................................................... 350/354
[58] Field of Search ...................... 350/354; 372/21, 22

[56] References Cited

U.S. PATENT DOCUMENTS

| | | | |
|---|---|---|---|
| 4,401,817 | 8/1983 | Paget et al. | 548/141 X |
| 4,596,823 | 6/1986 | Jones et al. | 514/559 X |
| 4,659,177 | 4/1987 | Choe et al. | 350/96.34 |

OTHER PUBLICATIONS

Frazier et al., "Second Harmonic Generation in Aromatic Organic Compounds," J. Opt. Soc. Am. B, vol. 4, No. 11, Nov. 1987, pp. 1899–1903.
Azema et al., "Highly Efficient SHG ...", Society of Photo-Optical Instrument Optical Instrument Engineers, Proceedings, V. 400, 1983, pp. 183–186.
Twieg et al., "Organic Materials for Non-Linear Optics ...", Chem. Phys. Ltrs, V. 92, No. 2, Oct. 15, 1982, pp. 208–210.
Halbout et al., "Efficient Phase-Matched Second-Harmonic Generation ...", IEEE Journal of Quantum Electronics, vol. QE-15, No. 10, Oct. 1979, pp. 1176–1179.
Jain et al., "Optically Non-Linear Organic Materials", Optics & Laser Technology, Dec. 1981, pp. 279–301.
Halbout et al., "Evaluation of the Phase-Matching Properties ...", IEEE Journal of Quantum Electronics, vol. QE-17, No. 4, Apr. 1981, pp. 513–517.
Twieg et al., "New Organic Materials with Exceptionally Large Second-Order Optical Nonlinearity", Polymer Preprints, vol. 23, 1982.

Primary Examiner—Eugene R. Laroche
Assistant Examiner—Nathan W. McCutcheon
Attorney, Agent, or Firm—Gay Chin; Herbert W. Mylius

[57] ABSTRACT

Certain benzophenone derivatives having acentric crystalline space groups are disclosed as second-order nonlinear optical materials. The second harmonic signal of such derivatives is enhanced for compounds containing an electron-donating group attached to one of the benzene rings and which is para relative to the carbonyl group of the benzophenone derivative. Benzophenone hydrazone, 4-aminobenzophenone, and 4-amino-3-nitrobenzophenone are exemplary benzophenone derivatives according to the invention. Also disclosed are nonlinear optical devices which include single crystals of the benzophenone derivatives.

23 Claims, 1 Drawing Sheet

Variation of Second Harmonic Signal of
4-Aminobenzophenone with Powder Particle Sizes.

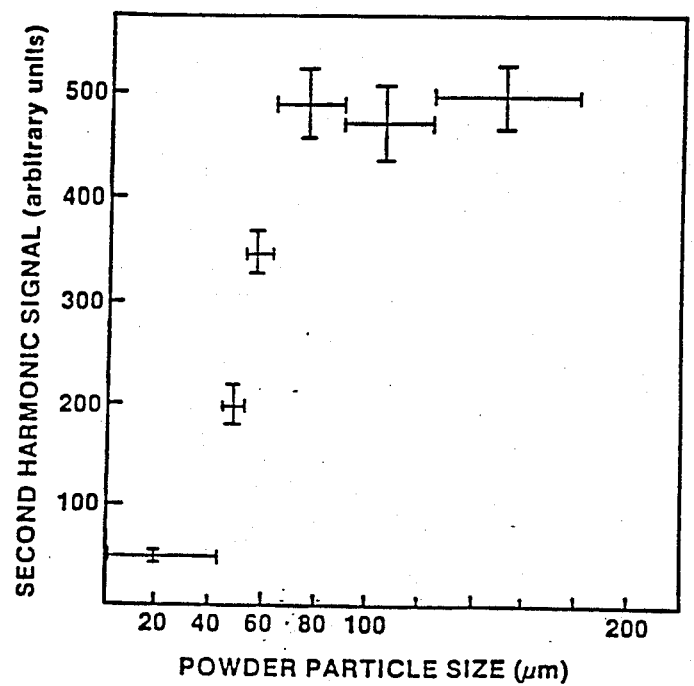
FIGURE 1. Variation of Second Harmonic Signal of 4-Aminobenzophenone with Powder Particle Sizes.

OPTICAL MONLINEARITY OF AMINOBENZOPHENONE DERIVATIVES

BACKGROUND OF THE INVENTION

This invention relates to organic nonlinear optical materials and, more particularly, to materials which exhibit a large second-order optical nonlinearity and good optical transmission.

Nonlinear optical materials appear to have potential applications in such emerging fields as optical communications, sensor protection and laser technology. Second-order nonlinear optical materials have been proposed for use in such devices as waveguides, frequency doublers, parametric amplifiers, electrooptic modulators and optical switches. However, organic materials having large optical nonlinearities which have so far been investigated have failed to satisfy all of the requirements demanded by these devices. A major detraction to most of the known organic second-order nonlinear optical materials is their color. The crystals of 2-methyl-4-nitroaniline (MNA), for example, are bright yellow. When working with diode lasers, the color of the nonlinear optical material must be considered and the lack of color in such material is the ideal. For an organic material to be of practical significance as a second harmonic generator, crystals of the compound must be phase matchable, i.e., capable of allowing the second harmonic signal to increase nonoptically as it passes through the crystal.

SUMMARY OF THE INVENTION

It is a primary objective of this invention to provide colorless, organic nonlinear optical materials which are phase matchable.

While benzophenone itself has previously been evaluated as a potential nonlinear optical material, it has now been discovered that certain benzophenone derivatives are second harmonic generators having superior properties when compared to the parent compound and to prior art organic nonlinear optical materials.

More specifically, 4-aminobenzophenone is a benzophenone derivative according to the present invention and has been found to have a very large frequency doubling efficiency, as well as very good visible transmission and phase matching properties. These features indicate that this material is especially suitable for use in devices for frequency doubling of diode lasers.

Other benzophenone derivatives according to this invention are 4-amino-3-nitrobenzophenone and benzophenone hydrazone. The large second-order nonlinearities and good transmission characteristics of these benzophenone derivatives make them useful for any application where a large second-order susceptability, X(2), and low absorption in the visible spectrum are required.

BRIEF DESCRIPTION OF THE DRAWING

FIG. 1 is a graph where the intensities of the second harmonic signals from a range of powder particle sizes of 4-aminobenzophenone are plotted versus particle size.

DESCRIPTION OF PREFERRED EMBODIMENTS

Several concepts must be kept in mind when evaluating for practical applications an organic compound having a large optical nonlinearity. Second harmonic generation (SHG) in crystals is a second-order nonlinear process and is influenced by molecular structure and crystalline arrangement. It has been shown by J. L. Oudar in J. Chem. Phys. 67, 446 (1977), that second-order nonlinearity in organic compounds is enhanced by extended conjugation and the presence of a low-lying, spectroscopic charge transfer arising from electron-donating and electron-accepting substituents on an aromatic ring, or a similar conjugated system. Moreover, for SHG to be observed in organic crystals composed of molecules having such structural features, the crystalline unit cell must lack a center of inversion symmetry.

An examination of the crystallographic literature on purely organic benzophenone derivatives reveals twenty-five published structure determinations. Six of these structures, as well as benzophenone itself, have acentric crystalline space groups and all of these compounds produce second harmonic signals.

The second harmonic generation (SHG) efficiencies of eight benzophenone derivatives are shown in Table I below:

TABLE I

| Compound | SHG Efficiency (ADP = 1.0) |
| --- | --- |
| 4-aminobenzophenone (100 m) | 360 |
| 4-amino-3-nitrobenzophenone | 33 |
| 2-amino-5-nitrobenzophenone | 0.1 |
| benzophenone | 1.9 |
| 3,3'-diaminobenzophenone | 1.9 |
| 3,4-diaminobenzophenone | 2.7 |
| 4-nitrobenzophenone | 0.01 |
| benzophenone hydrazone | 9.7 |

The SHG efficiencies are determined by the powder technique described by Kurtz and Perry in J. Appl. Phys. 39, 3798 (1968) in which the second harmonic output is generated by irradiating powder samples of randomly oriented crystallites. In the usual procedure, the incident radiation (1.06 $\mu$m) comes from a Q-switched and mode-locked Nd:YAG laser having a pulse train of 10 pulses of 90-psec duration with 7-nsec separation. An Amperex S-11 photomultiplier is used to detect the second harmonic generated by the samples.

The powders are measured in 0.5 mm thick fused silica cells. The quoted SHG efficiencies of Table I are normalized to the signal obtained from 90 to 125 $\mu$m-sized ammonium dihydrogen phosphate (ADP) samples in similar 0.5 mm cells. This range of particle sizes of the ADP powder has been chosen as a reference because most of the organic compounds which have previously been investigated have been roughly this size or smaller. Except where noted, the measured compounds are examined as unsized particles. Most compounds were purchased at the highest available purity from their suppliers and were not further purified.

The benzophenone derivatives listed in Table I have not previously been evaluated as potential nonlinear optical materials. The carbonyl group of aromatic ketones acts as an electron-withdrawing substituent, but by adding an electrondonating group, such as an amine, to one or both of the aromatic rings of the benzophenone base compound, a charge transfer interaction is established which has been found to enhance the nonlinearity of the aromatic ring system. The electronic characteristics and position on the ring(s) of the electron-donating substituent(s), however, will influence the spectroscopic charge transfer(s) and the second-order susceptability, X(2), of the respective compounds.

While the molecular structures and arrangements of the individual molecules in the crystallographic unit cells must be considered together in order to completely account for the observed macroscopic second-order susceptabilities of the benzophenone derivatives, some conclusions are suggested from correlation of the data in Table I with their molecular structures. For 4-nitrobenzophenone, for example, the presence of an electron-accepting nitro group in the absence of a corresponding electron-donating substituent on the ring structure diminishes the observed second harmonic signal for the compound as compared to benzophenone. The substitution of an electron-donating amino group on one benzene ring, para- to the carbonyl group, as in 4-aminobenzophenone, gives a strong charge transfer interaction along the two-fold rotational axis of the benzene ring resulting in a substantial second harmonic signal from this compound. The signal is approximately 28% of that observed for 2-methyl-4-nitroaniline (100 μm powder, sublimated) using the powder technique of Kurtz and Perry.

Attaching an amino group to each benzene ring, as in 3,3'-diaminobenzophenone, is an ineffective way of enhancing SHG efficiency over benzophenone, presumably because the amino groups are not para- to the carbonyl group and because the two charge-transfer vectors partially cancel each other. However, with two amino substituents on the same ring, as in 3,4-diaminobenzophenone, SHG is minimally enhanced. Whether the 3-amino group interferes with the strong para-interaction of the 4-amino substituent and carbonyl group or causes detrimental changes in the molecular arrangement in the unit cell cannot be answered without additional structural information.

When amino and nitro groups are present on the same benzene ring, their relative positions with respect to each other and the carbonyl group determine the magnitude of the generated second harmonic. For example, 4-amino-3-nitrobenzophenone has an SHG efficiency which is 330 times that of 2-amino-5-nitrobenzophenone. Crystallographic data, once again, are required to clarify the relative importance of molecular structure versus crystal structure, but it is believed that the para-positioning of the amino and carbonyl groups in 4-amino-3-nitrobenzophenone is more significant in accounting for good SHG efficiency than are crystallographic differences between the two compounds.

The SHG efficiency for benzophenone hydrazone is roughly comparable to that of urea, indicating that the compound is worthy of continued investigation.

In addition to its impressive SHG efficiency, 4-aminobenzophenone has other physical characteristics that contribute to its potential as a nonlinear material for device applications. For instance, its crystals are colorless, as compared to the bright yellow crystals of 2-methyl-4-nitroaniline (MNA) and the yellows and oranges of other efficient, organic second harmonic generators.

The visible transmission characteristics of several benzophenone derivatives and MNA can be compared in Table II from the cutoff values, defined as the wavelength where transmission drops to 95% for a $4 \times 10^{-4}$M tetrahydrofuran solution.

TABLE II

| Compound | Cutoff Wavelength (nm) |
| --- | --- |
| 4-aminobenzophenone (recrystallized) | 394 |
| 4-aminobenzophenone (recrystallized from methanol-water) | 411 (in ethanol) |
| 2-amino-5-nitrobenzophenone | 419 |
| 4-amino-3-nitrobenzophenone | 463 |
| benzophenone | 375 |
| 3,3'-diaminobenzophenone | 412 |
| 2-methyl-4-nitroaniline (MNA), sublimed | 426 |
| 2-methyl-4-nitroaniline (MNA), Aldrich (97%) | 456 (in ethanol) |
| 2-methyl-4-nitroaniline (MNA) | 458 (in ethanol) |
| 4-nitrobenzophenone | 393 |
| benzophenone hydrazone | 390 |

Although benzophenone has the shortest cutoff wavelength, that for 4-aminobenzophenone at 394 is also in the ultraviolet region. Note that the cutoff wavelength for MNA is in the visible range (46 nm and 456 nm in ethanol).

For a crystalline material to be of practical significance as a second harmonic generator, bulk crystals of the compound must be phase matchable, that is, allow the second harmonic signal to increase monotonically as it passes through the crystal. To determine phase matchability of a bulk material of interest, the relative SHG efficiencies of a range of powder particle sizes are measured. The second harmonic intensity of compounds that are not phase matchable will show a linear increase with increasing particle size, with the intensity peaking for particle sizes close to the average coherence length and then decreasing (with an inverse relationship between particle size and intensity) for particle sizes greater than the coherence length. Phase-matchable compounds, on the other hand, exhibit a nearly linear increase in intensity with particle size up to the average coherence length, at which point the intensity levels off and is independent of particle size.

This latter effect is shown in FIG. 1, where the intensities of the second harmonic signals from a range of powder particle sizes of 4-aminobenzophenone are plotted versus particle size. According to the characteristic observed pattern, bulk crystals of 4-aminobenzophenone should be phase matchable.

The amine group of 4-aminobenzophenone may be modified by alkylation. Moreover, both of the benzene rings may have any number of other substituents.

Efforts to grow large optical-quality crystals of the benzophenone derivatives of this invention are illustrated in the following examples.

EXAMPLE 1

Single crystals of benzophenone hydrazone of good optical quality are grown from seed crystals in ethyl acetate at room temperature. The average size of useable crystals produced by this method is 75 mm$^3$.

EXAMPLE 2

Good optical quality crystals of 4-aminobenzophenone are grown from a saturated seeded dichloromethane solution maintained at room temperature. The average size of useable crystal is 144 mm$^3$.

EXAMPLE 3

Crystals of 4-aminobenzophenone of good optical quality are grown from a stirred unseeded dichloromethane solution by slow cooling from 44° to 36° C. The average size of useable crystals is 64 mm³.

SHG has been observed from single crystals of benzophenone hydrazone and 4-aminobenzophenone. Phase matched SHG has been observed from a single crystal of 4-aminobenzophenone using a 1.06 μm fundamental frequency. Such crystals have been successfully tested a frequency doublers.

Thin film waveguides have been made by subliming onto transparent glass substrates either benzophenone hydrazone or 4-aminobenzophenone. Electrodes may be attached to such composite structures by known techniques in order to provide a variety of electro-optical devices.

I claim:

1. A second harmonic generator consisting essentially of a single crystal of a benzophenone derivative having an acentric crystalline space group.

2. A second harmonic generator according to claim 1 wherein said benzophenone derivative is benzophenone hydrazone.

3. A second harmonic generator according to claim 1 wherein said benzophenone derivative has at least one electron-donating group attached directly to one or both of its aromatic rings.

4. A second harmonic generator according to claim 3 wherein at least one of said electron-donating groups is para relative to the carbonyl group of said benzophenone derivative.

5. A second harmonic generator according to claim 4 wherein said electron-donating group is an amine or an alkylated amine.

6. A second harmonic generator according to claim 5 wherein said benzophenone derivative is 4-aminobenzophenone.

7. A second harmonic generator according to claim 5 wherein said benzophenone derivative is 4-amino-3-nitrobenzophenone.

8. A nonlinear optical device comprising a transparent glass substrate and a single crystal layer of a benzophenone derivative having acentric crystalline space groups coated onto said substrate.

9. A nonlinear optical device according to claim 8 wherein said benzophenone derivative is benzophenone hydrazone.

10. A nonlinear optical device according to claim 8 wherein said benzophenone derivative has at least one electron-donating group attached directly to one or both of its aromatic rings.

11. A nonlinear optical device according to claim 10 wherein at least one of said electron-donating groups is para relative to the carbonyl group of said benzophenone derivative.

12. A nonlinear optical device according to claim 11 wherein said electron-donating group is an amine or an alkylated amine.

13. A nonlinear optical device according to claim 12 wherein said benzophenone derivative is 4-aminobenzophenone.

14. A linear optical device according to claim 12 wherein said benzophenone derivative is 4-amino-3-nitrobenzophenone.

15. A phase matchable second second harmonic generator comprising a transparent glass substrate having coated thereupon a single crystal layer of a benzophenone derivative acentric crystalline space groups.

16. A phase matchable second harmonic generator according to claim 14, wherein said benzophenone derivative is 4-aminobenzophenone.

17. A phase matchable second harmonic generator according to claim 15, wherein said benzophenone derivative is benzophenone hydrazone.

18. A frequency doubler comprising a transparent glass substrate having coated thereupon a single crystal layer of a benzophenone derivative having acentric crystalline space groups.

19. A frequency doubler according to the claim 18, wherein said benzophenone derivative is 4-aminobenzophenone.

20. A frequency doubler according to claim 18, wherein said benzophenone derivative is benzophenone hyrazone.

21. A nonlinear optical device including a thin film wave guide comprising a transparent glass substrate having coated thereupon a single crystal layer of a benzophenone derivative having acentric crystalline space groups.

22. A nonlinear optical device according to claim 21 wherein said benzophenone derivative is 4-aminobenzophenone.

23. A nonlinear optical device according to claim 21 wherein said benzophenone derivative is benzophenone hydrazone.

* * * * *

UNITED STATES PATENT AND TRADEMARK OFFICE
CERTIFICATE OF CORRECTION

PATENT NO. : 4,909,608
DATED : March 20, 1990
INVENTOR(S) : Claude C. Frazier, III It is certified that error appears in the above-identified patent and that said Letters Patent is hereby corrected as shown below:

In the Title, "Monlinearity" should read --Nonlinearity--.

Column 1, line 29, "nonoptically" should read --monotonically--.

Claim 14, line 1, "linear" should read --nonlinear--.

Claim 15, line 4, "derivative acentric" should read --derivative having acentric--.

Claim 16, line 2, "14" should read --15--.

Signed and Sealed this

Twelfth Day of March, 1991

*Attest:*

HARRY F. MANBECK, JR.

*Attesting Officer*    *Commissioner of Patents and Trademarks*